United States Patent
Koegler et al.

(10) Patent No.: US 9,638,225 B2
(45) Date of Patent: May 2, 2017

(54) CLOSURE ELEMENT FOR A FIRE-PROTECTION SLEEVE

(71) Applicant: Hilti Aktiengesellshaft, Schaan (LI)

(72) Inventors: Markus Koegler, Kaufering (DE); Christian Foerg, Dillishausen (DE)

(73) Assignee: Hilti Aktiengesellschaft, Schaan (LI)

( * ) Notice: Subject to any disclaimer, the term of this patent is extended or adjusted under 35 U.S.C. 154(b) by 35 days.

(21) Appl. No.: 14/431,009

(22) PCT Filed: Sep. 24, 2013

(86) PCT No.: PCT/EP2013/069768
§ 371 (c)(1),
(2) Date: Mar. 25, 2015

(87) PCT Pub. No.: WO2014/048889
PCT Pub. Date: Apr. 3, 2014

(65) Prior Publication Data
US 2015/0211557 A1 Jul. 30, 2015

(30) Foreign Application Priority Data
Sep. 26, 2012 (DE) .................. 10 2012 217 372

(51) Int. Cl.
*F16B 2/22* (2006.01)
*A62C 3/00* (2006.01)
(Continued)

(52) U.S. Cl.
CPC ............... *F16B 2/22* (2013.01); *A62C 2/065* (2013.01); *A62C 3/00* (2013.01); *F16L 3/1222* (2013.01);
(Continued)

(58) Field of Classification Search
CPC ... F16B 2/22; F16L 3/1222; F16L 3/01; F16L 3/012; F16L 3/015; F16L 3/02;
(Continued)

(56) References Cited

U.S. PATENT DOCUMENTS 2,501,519 A * 3/1950 Hosey .................. A47G 25/485
24/703.3
4,850,385 A * 7/1989 Harbeke ................ A62C 2/065
137/75
(Continued)

FOREIGN PATENT DOCUMENTS

EP 0 486 299 A1 5/1992
EP 1 180 629 A2 2/2002
(Continued)

OTHER PUBLICATIONS

PCT/EP2013/069768, International Search Report dated Sep. 22, 2014 (Three (3) pages).
(Continued)

*Primary Examiner* — Robert J Sandy
(74) *Attorney, Agent, or Firm* — Crowell & Moring LLP

(57) ABSTRACT

A closure element for a fire-protection sleeve is disclosed. The closure element has a body, a connecting element, and at least one locking element for a form-fitting connection to an intumescent strip. The body and the connecting element are designed in one piece.

16 Claims, 2 Drawing Sheets

(51) Int. Cl.
*F16L 3/12* (2006.01)
*A62C 2/06* (2006.01)
*F16L 5/04* (2006.01)
*A44B 11/00* (2006.01)

(52) U.S. Cl.
CPC .............. *F16L 5/04* (2013.01); *A44B 11/006* (2013.01); *Y10T 24/44248* (2015.01); *Y10T 24/45173* (2015.01); *Y10T 24/45215* (2015.01)

(58) Field of Classification Search
CPC ....... F16L 3/08; F16L 5/00; F16L 5/04; A44B 19/00; A62C 2/00; A62C 2/065; A62C 3/00; A62C 4/00; Y10T 24/45173; Y10T 24/44248; A44D 2200/12
See application file for complete search history.

(56) References Cited

U.S. PATENT DOCUMENTS

| | | | | |
|---|---|---|---|---|
| 5,103,609 A * | 4/1992 | Thoreson | ................ | A62C 2/065 52/232 |
| 2002/0029443 A1 | 3/2002 | Ortiz | | |
| 2002/0056242 A1 * | 5/2002 | Andresen | ................ | F16L 5/04 52/220.8 |
| 2004/0149390 A1 * | 8/2004 | Monden | .................... | F16L 5/04 156/391 |
| 2007/0151183 A1 * | 7/2007 | Stahl, Sr. | .................. | F16L 5/04 52/317 |
| 2010/0242252 A1 * | 9/2010 | Foerg | ........................ | F16L 5/04 29/428 |
| 2011/0210222 A1 * | 9/2011 | Van Walraven | .......... | F16L 5/04 248/315 |
| 2013/0086856 A1 * | 4/2013 | Paetow | .................. | A62C 2/065 52/232 |

FOREIGN PATENT DOCUMENTS

| | | | | |
|---|---|---|---|---|
| EP | 1 422 459 A1 | 5/2004 | | |
| FR | 2 228 351 A7 | 11/1974 | | |
| FR | 2508287 A1 * | 12/1982 | .......... | A44B 11/006 |
| GB | 2 281 859 A | 3/1995 | | |

OTHER PUBLICATIONS

German-language German Office Action issued in German counterpart application No. 10 2012 217 372.2 dated Jan. 26, 2016 (Seven (7) pages).

* cited by examiner

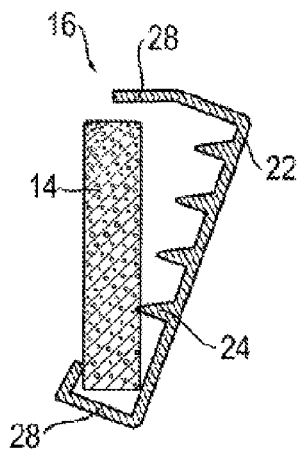
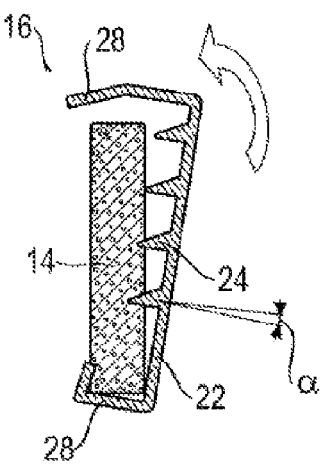
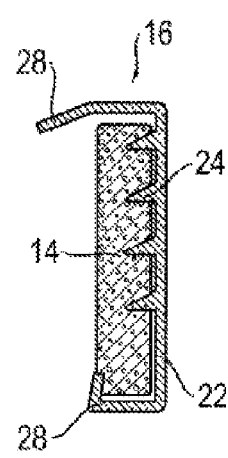
Fig. 4a  Fig. 4b  Fig. 4b
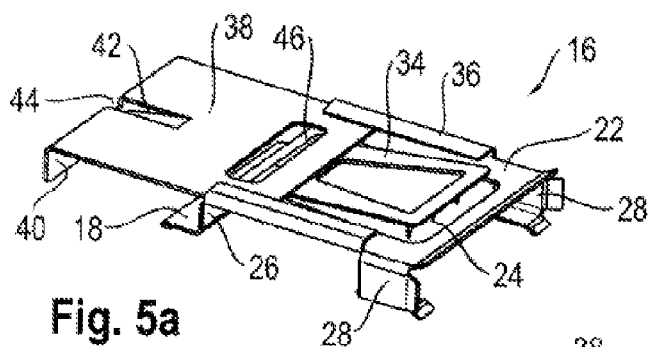
Fig. 5a
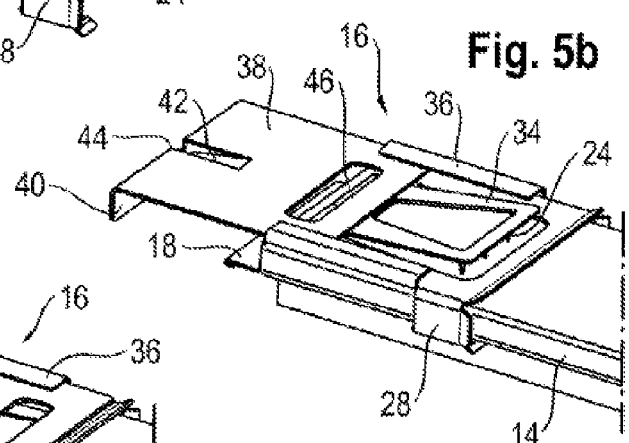
Fig. 5b
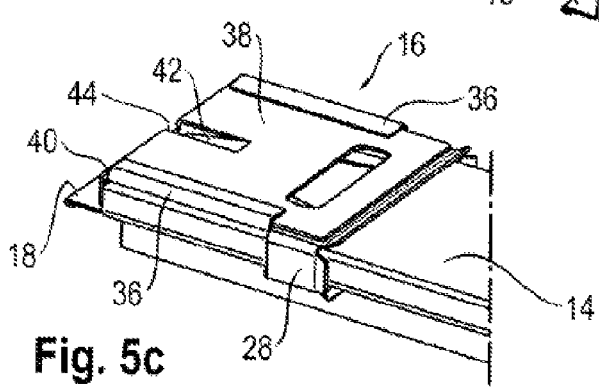
Fig. 5c

CLOSURE ELEMENT FOR A FIRE-PROTECTION SLEEVE

This application claims the priority of International Application No. PCT/EP2013/069768, filed Sep. 24, 2013, and German Patent Document No. 10 2012 217 372.2, filed Sep. 26, 2012, the disclosures of which are expressly incorporated by reference herein.

BACKGROUND AND SUMMARY OF THE INVENTION

The invention relates to a closure element for a fire-protection sleeve.

Closure elements for fire-protection sleeves are known from the prior art and are used to affix and/or to secure the fire-protection sleeve on a pipe, for example. There are many designs for the fire-protection sleeves, for example, sleeves which are limited to a very narrow diameter range or so-called continuous sleeves, which are adapted to the corresponding diameter of the pipe and are provided with a closure element that affixes the fire-protection sleeve on the pipe. The continuous sleeves may typically be secured by wrapping them with a tension belt on the pipe, so that the tension belt acts as a closure element. Alternatively, there is the possibility of enclosing the fire-protection sleeve in a metal housing, which functions as the closure element. The metal housing is cut to the corresponding diameter of the pipe and then wrapped around the fire-protection sleeve enclosing the pipe. The housing may consist of many elements, which are aligned with one another like a chain or of a thin, flexible metal. The butt joint formed by the two open ends of the metal housing is held together by means of additional securing elements. The metal housing thus encloses the fire-protection sleeve completely and affixes it on the pipe. Since such a metal housing can be cut to a certain length, it is suitable for various pipe diameters.

With the usual closure elements known from the prior art, the fire-protection sleeve is secured on the pipe by means of a jacket element, which completely encloses the fire-protection sleeve and is equipped with a closure element.

It has been found to be a disadvantage of the approaches known from the prior art that wrapping the fire-protection sleeve during mounting requires a great deal of space, which is not necessarily available. Furthermore, securing the fire-protection sleeve with a metal housing that can be cut to size is tedious because the metal housing must be shortened to the correct length.

The object of the invention is therefore to create a closure element for a fire-protection sleeve that is both space-saving and easy to attach.

To solve this problem according to the invention, a closure element is provided for a fire-protection sleeve, having a body, a connecting element and at least one locking element for a form-fitting connection to an intumescent strip, wherein the body and the connecting element are designed in one piece. The invention is based on the basic idea of creating a closure like that on a belt with two buckles, such that a belt buckle is represented by the closure element, and the belt is represented by the intumescent strip. As in the case of the belt principle, it is provided according to the invention that the intumescent strip is wrapped around the element to be protected and is then secured by means of the two connecting elements, wherein the connecting elements are connected to one another like two belt buckles.

One end of the locking element preferably forms an acute angle of max. 90°. The acutely shaped locking element ensures that it can penetrate more easily into the intumescent strip, so that only manual force is needed for depressing the locking element, thereby simplifying mounting.

In particular the locking element protrudes from the body approximately at a right angle. This ensures that the locking element will not bend when being attached to the intumescent strip.

In a particularly preferred embodiment, the locking element is positioned in relation to a tension direction of the closure element. By setting the locking element at an angle, the locking element can engage more easily in the intumescent strip and can become hooked in it, so that only a tension force in a certain direction is necessary. Due to the hooking, a stronger connection of the closure element to the intumescent strip is achieved by means of the locking elements.

The locking element is preferably designed in one piece with the body. The one-piece design of the locking element with the body has the advantage that it is not necessary to mount the closure element because the locking element need not be connected to the body by means of fastening means in an extra step. Furthermore, due to the one-piece design a greater transfer of force from the locking element to the body is ensured.

In a particularly preferred embodiment, the locking element is bent out of the body. For example, the locking element is punched out of the body and is thus designed in one piece with the body so that material can be saved in the production of the locking element.

In another embodiment, the locking element is cut from the body. This means that the locking element is formed on one edge of the body and stands away from the edge of the body as projecting material. This embodiment of the locking element represents a particularly simple production of the locking element because the contour of the locking element can be punched out of sheet metal with the locking elements arranged on the edge.

The body preferably has at least one flexible strap, which is arranged on its edges and partially encloses the intumescent strip in the bent form. The strap on the body may first serve as a guide element to guide the closure element over the intumescent strip, wherein the strap later serves as a securing strap for fixation. To do so, the strap is bent around and encloses the intumescent strip at least partially.

The body in particular has a fastening section, which serves to fasten the closure element on a fastening location, in particular on a wall. Due to the design of a fastening section on the body, the closure element may be fastened directly onto a wall, for example, in order to mount and/or fasten the closure element, which is arranged on a fire-protection sleeve.

In a particularly preferred embodiment, the fastening section is connected to the body by means of an intended bending point. This offers the advantage that the closure element can be bent and thus adapted better to the radius of the pipe. Accordingly, the mounting can be adapted better to the local conditions, so that the flexibility is greatly increased.

In a particularly preferred embodiment, the body has a spring element, wherein the at least one locking element is arranged on the spring element. The design of the spring element on the body fundamentally ensures that the closure element can be pushed onto the intumescent strip without the locking elements engaging in the intumescent strip. This may be accomplished by means of the spring element in two ways. First, the spring element may be designed so that the locking element does not come in contact with the intumescent strip in its starting position and therefore also does not come in contact when the closure element is pulled over the intumescent strip. Therefore, the spring element is attached to the body at an angle. Second, the spring element may be designed in a plane with the body, wherein the locking element is positioned on the spring element opposite the mounting direction, which is preferably greater than 45° to the normal of the spring element. The spring element together with the locking element arranged thereon can therefore slide elastically over the intumescent strip during mounting. Because of the placement of the locking element, engagement of the locking element in the intumescent strip of the closure element is impossible when the closure element is pushed onto the intumescent strip in the longitudinal direction.

A blocking element, which acts on the spring element in a locking direction when in a locking position and thus prevents the spring element from springing back, is preferably provided. In the locked state of the closure element, the spring element is acted on by the blocking element in the locking direction, so that the blocking element, which engages with the intumescent strip, is secured mechanically. The blocking element thus serves as additional fixation for the locking element.

The body preferably has guide rails on the side facing away from the locking element, with the blocking element running in the guide rails. The guide rails guide the blocking element on a defined insertion path, so that the spring element is acted upon in the locking position. In addition, the guide rails hold the blocking element in a position in which it acts upon the spring element against the spring action of the spring element.

In particular the closure element has a hermaphroditic design, so that the connecting element can engage with the connecting element of a second closure element. One closure element can thus be used for both sides of the closure, so that it is not necessary to pay attention to whether both components of the closure are present in mounting because there is only one type, i.e., component, which can be used for both sides.

In addition, a fire-protection element consisting of a fire-protection sleeve and two closure elements of the aforementioned type is provided, wherein the connecting element of the one closure element engages with the connecting element of the other closure element, and the locking elements of both closure elements engage with the intumescent strip. The fire-protection sleeve is thus effectively secured because the two ends of the fire-protection sleeve and/or of the intumescent strip are connected in a force-locking manner by the closure elements arranged thereon.

If the fire-protection sleeve is not positioned so that it is inserted into the ring gap between a wall bushing and a pipe, for example, but instead is then affixed on the wall bushing, then sheathing of the intumescent strip with a thermally stable material is necessary in order to direct the intumescent in the direction of the pipe and/or the wall bushing in the event of a fire and to thereby seal the wall bushing.

The material is expediently created, so that the at least one locking element can penetrate it easily, i.e., without expending a great force. Suitable materials are of a type such that they do not lose their mechanical strength at the temperatures which occur in the event of a fire such as glass fibers or other mineral materials, for example. These materials may be in the form of a woven fabric, a mesh, a fleece or as a thin solid material.

Additional advantages and features of the invention are derived from the following description and from the following drawings, to which reference is made.

BRIEF DESCRIPTION OF THE DRAWINGS

FIG. 4a shows a sectional view of a second embodiment of the closure element according to the invention before mounting, FIG. 4b shows the closure element from FIG. 4a during mounting, FIG. 4c shows the closure element from FIGS. 4a and 4b in a locking position, FIG. 5a shows a perspective view of the closure element according to another embodiment before mounting, FIG. 5b shows the closure element from FIG. 5a during mounting, and FIG. 5c shows the closure element from FIGS. 5a and 5b in a locking position.

DETAILED DESCRIPTION OF THE DRAWINGS

Figure 1:
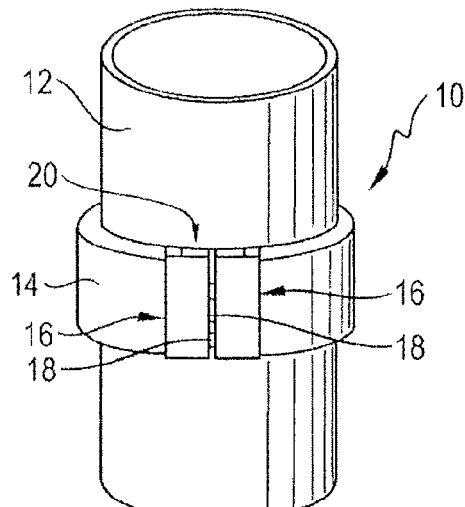
FIG. 1 shows a perspective view of a fire-protection element according to the invention.

FIG. 1 shows a fire-protection element 10, which is arranged around a pipe 12. The fire-protection element 10 has an intumescent strip 14. A closure element 16 is arranged on each end of the intumescent strip 14. Each closure element 16 has a connecting element 18. With the help of the connecting elements 18, the closure elements 16 arranged at the ends of the intumescent strip 14 can be joined together in a force-locking manner. The two closure elements 16 thus form a two-part closure 20, as in the case of a belt having two closures.

The exact design of the closure element 16 and its mounting on the intumescent strip 14 will now be explained in detail on the basis of the following figures.

Figure 2:
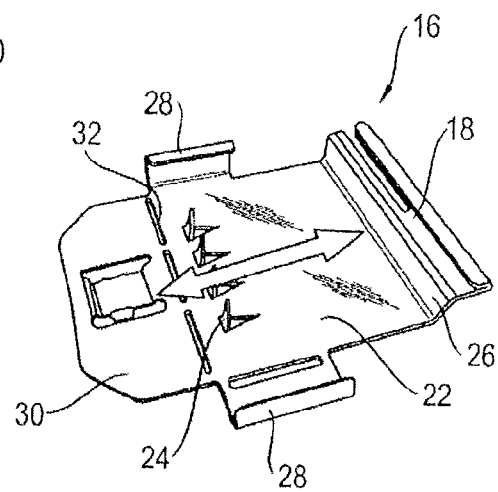
FIG. 2 shows a perspective view of a closure element according to the invention for a fire-protection element according to FIG. 1.

FIG. 2 shows a perspective view of the closure element 16, which has a body 22. Locking elements 24 punched out of the body 22, protruding at a right angle away from the body 22 and fastening the closure element 16 through engagement and/or hooking on the intumescent strip 14, are arranged on the body 22.

In addition, a connecting element 18, which is designed in the form of a strap closure, is arranged on the body 22. The connecting element 18 can cooperate with another connecting element 18 of a second closure element 16, as shown in FIG. 1. The connecting element 18 is arranged on a section, which is arranged behind an offset piece 26, which serves as a positioning aid in mounting the closure element 16 on the intumescent strip 14.

In addition straps 28, which are flexible and can function as guide elements in mounting, are arranged on the body 22.

The body 22 also has a fastening section 30, which is connected to the body 22 by means of an intended bending point 32. The fastening section 30 serves to fasten and/or mount the closure element 16 on a wall. Thanks to the intended bending point 32, the fastening section 30 can be bent around the body 22 at an angle, so that the closure element 16 can be adjusted to different pipe diameters.

Figure 3A:
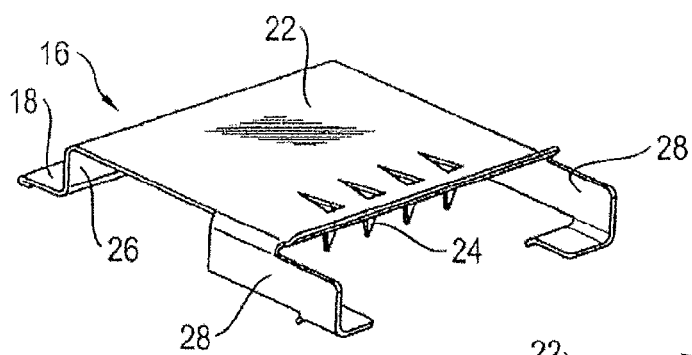
FIG. 3a shows a perspective view of a simplified closure element before mounting on an intumescent strip.
Figure 3B:
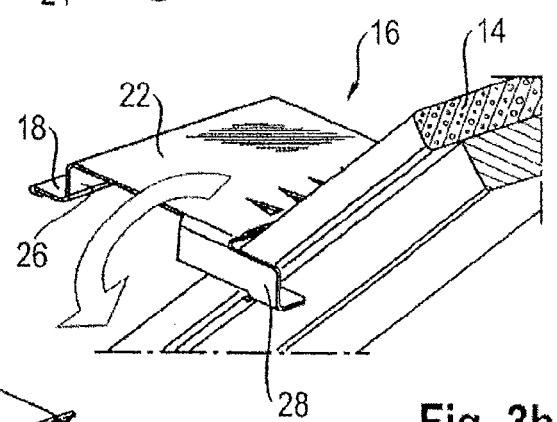
FIG. 3b shows the closure element from FIG. 3a during mounting.
Figure 3C:
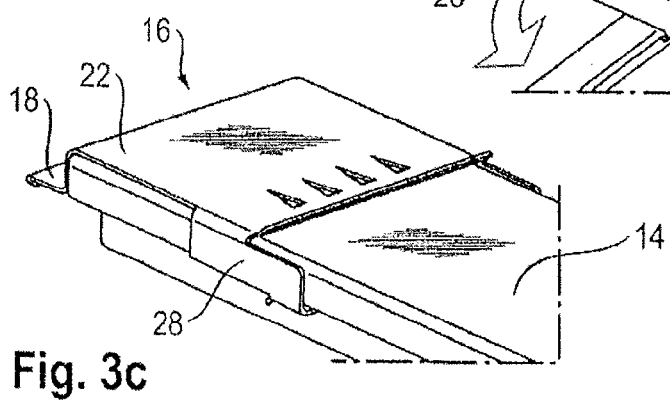
FIG. 3c shows the closure element from FIGS. 3a and 3b in a locking position.

On the basis of FIGS. 3a to 3c, mounting of the closure element 16 according to the invention on the intumescent strip 14 is explained.

FIG. 3a shows a simplified embodiment of the closure element 16, wherein the same reference numerals are used for the features known from the previous figures.

In addition to the closure element 16, FIG. 3b also shows the intumescent strip 14, which is situated between the two straps 28 of the closure element 16 during the mounting. The straps 28 serve as the pivot point in mounting the closure element 16 on the intumescent strip 14. The closure element 16 is connected to the intumescent strip 14 by being pivoted in the direction of the arrow. The locking elements 24 then engage in the intumescent strips 14 and become hooked in it, thus establishing a form-fitting engagement of the locking elements 24 with the intumescent strip 14.

In FIG. 3c, the closure element 16 is connected to the intumescent strip 14.

The connecting element 18, which is designed as a strap closure in the embodiment shown here, is arranged at the end, where the offset piece 26 is located. The connecting element 18 may be brought into engagement with another connecting element 18 on another closure element 16. This is shown in principle in FIG. 1.

FIGS. 4a to 4c show the closure element 16 according to another embodiment.

The closure element 16 has a body 22, on which two straps 28 are arranged. The one strap 28 serves as a positioning aid, while the other strap 28 functions as a securing element after being mounted. Furthermore, acute locking elements 24 are arranged on the body 22, these locking elements being positioned at an angle α to the body 22. The locking elements 24 are pressed into the intumescent strip 14, so that the closure element 16 is connected to the intumescent strip 14.

The closure element 16 of this embodiment is not mounted centrally, as was the case in FIGS. 3a to 3c, but instead is mounted at the side by means of a lever process. The closure element 16 is therefore in contact with one edge of the intumescent strip 14 thanks to one of its straps 28 and is mounted on a side thereof. In the embodiment shown here, the locking elements 24 are positioned at the angle α to body 22, so the locking elements 24 can engage better and/or more easily in the intumescent strip 14.

The direction arrow shown in FIG. 4b indicates the direction, according to which the closure element 16 is moved around the intumescent strip 14 and is thereby secured. One of the straps 28 is in contact with the intumescent strip 14 and thus defines a point about which the closure element 16 is pivoted. Furthermore, it is clear from FIG. 4b that the locking elements 24 engage in the intumescent strip 14 at a right angle, although the body 22 of the closure element 16 is tilted at an angle to the intumescent strip 14. This is ensured by positioning the locking elements 24 at the angle α to the body 22, so that the locking elements 24 do not stand exactly perpendicular to the body 22.

FIG. 4c shows the closure element 16 in a form-fitting connection with the intumescent strip 14 because all the locking elements 24 are in form-fitting connection with the intumescent strip 14. The bottom strap 28 of the closure element 16 already engages around the intumescent strip 14 so that the top strap 28 must still be bent around the intumescent strip 14 in the direction of the arrow. Then the closure element 16 is connected in a form-fitting manner to the intumescent strip 14 by the locking elements 24 and is additionally secured by the straps 28 on the intumescent strip 14.

FIGS. 5a to 5c show another embodiment of the closure element 16 according to the invention as well as its mounting on the intumescent strip 14.

The closure element 16 of this embodiment also has, in addition to the features already known, a spring element 34 on which the locking elements 24 are arranged. In this embodiment, the spring element 34 is designed so that it springs away from the locking position when in the starting position shown in FIG. 5a, so that the spring element 34 does not lie in a plane with the body 22. Therefore, the locking elements 24 cannot come in contact with the intumescent strip 14 in the initial condition, i.e., during mounting. The locking elements 24 together with the spring element 34 must be actively pressed in the locking direction against the spring pressure of the spring element 34.

Furthermore, the body 22 of the closure element 16 also has guide rails 36, which serve to guide a blocking element 38. The blocking element 38 has a stop 40 as well as an additional securing element 42, which is provided in a recess 44 of the blocking element 38. The function of the blocking element 38 will be explained later.

The straps 28 arranged on the closure element 16 here again serve as guide elements for the intumescent strip 14 and the closure element 16 is already shown in its end position in FIG. 5b because the offset piece 26 is already in contact with the end of the intumescent strip 14.

However, the locking elements 24 are not yet engaged with the intumescent strip 14 in FIG. 5b. To attach the closure element 16 to the intumescent strip 14, the spring element 34 together with the locking elements 24 must be pressed by hand into the intumescent strip 14. In addition, the locking position can be secured by means of the blocking element 38, so that the latter is shifted along the guide rails 36 until the stop 40 is in contact with the offset piece 26. This ensures that the spring element 34 does not spring back.

Alternatively, however, the blocking element 38 may also press the locking elements 24 into the intumescent strip 14. To do so, the blocking element 38 is pushed along the guide rails 36, so that the blocking element 38 acts upon the spring element 34 in the locking direction, and thus the locking elements 24 are pressed into the intumescent strip 14.

The final locking position is shown in FIG. 5c, in which the blocking element 38 with its stop 40 is in contact with the offset piece 26 of the closure element 16 and thus the spring element 34 together with the locking elements 24 is acted upon and/or secured in the locking direction.

The blocking element 38 itself may also be secured mechanically. To do so, the securing element 42 is provided on the blocking element 38, which is provided in the recess 44 in the blocking element 38 and cooperates with an edge 46 of the body 22 to secure the blocking element 38 mechanically.

As in the preceding embodiments, the closure element 16 has a connecting element 18 which is in contact with the end of the intumescent strip 14 and can be connected to another connecting element 18 on another closure element 16.

Alternatively, in one embodiment not shown here, the spring element 34 may be designed so that it forms a plane with the body 22 in the starting position. The locking elements 24 are arranged on the spring element 34 and are set at a large angle to it, preferably greater than 45° to the normal of the spring element 34.

This embodiment ensures that when the closure element 16 is pushed onto the intumescent strip 14, the locking elements 24 will not engage directly with the intumescent strip 14. In mounting of the closure element 16 on the intumescent strip 14, the locking elements 24 instead slide over the intumescent strip 14 because of the recoiling spring element 34 and the offset locking elements 24.

For the final fixation of the closure element 16 on the intumescent strip 14, the closure element 16 can be pulled briefly in a direction opposite the direction of mounting, so that the locking elements 24, which are positioned in relation to the body 22, are engaged in the intumescent strip 14. Alternatively or additionally, they are actively pressed into the intumescent strip 14 against the spring force of the spring element 34. The blocking element 38 then serves as an additional means of securing the spring element 34 and secures it together with the locking elements 24, so that securing means are not absolutely necessary in this embodiment.

According to the invention, a fire-protection element 10 that is simple to use is created because only the intumescent strip 14 need be cut to size, the closure elements 16 must be attached to both ends of the intumescent strip 14, and then the two closure elements 16 are attached to one another.

The invention claimed is:

1. A closure element for a fire-protection sleeve, comprising:
    a body;
    a connecting element, wherein the body and the connecting element are formed in one piece; and
    a locking element, wherein the locking element is disposed on the body;
    wherein the body has a flexible strap extending perpendicularly from an edge of the body and partially enclosing an intumescent strip.

2. The closure element according to claim 1, wherein an end of the locking element forms an acute angle of a maximum of 90°.

3. The closure element according to claim 1, wherein the locking element protrudes approximately at a right angle from the body.

4. The closure element according to claim 1, wherein the locking element is positioned on the body in relation to a direction of tension of the closure element.

5. The closure element according to claim 1, wherein the locking element is formed in one piece with the body.

6. The closure element according to claim 1, wherein the locking element is bent out of the body.

7. The closure element according to claim 1, wherein the locking element is cut out of the body.

8. The closure element according to claim 1, wherein the locking element is attached to the body.

9. The closure element according to claim 1, wherein the body has a fastening section, wherein the closure element is fastenable on a wall with the fastening section.

10. The closure element according to claim 9, wherein the fastening section is connected to the body by an intended bending location.

11. The closure element according to claim 1, further comprising an offset piece that is disposed on an end of the body and wherein the offset piece is a positioning aid when mounting of the closure element on an intumescent strip.

12. The closure element according to claim 1, wherein the body has a spring element and wherein the locking element is disposed on the spring element.

13. The closure element according to claim 12, further comprising a blocking element wherein, in a locking position, the blocking element acts on the spring element in a locking direction and prevents recoil of the spring element.

14. The closure element according to claim 1, wherein the closure element has a hermaphroditic design such that the connecting element is engageable with a connecting element of a second closure element.

15. A fire-protection element, comprising:
    an intumescent strip; and
    a first and a second closure element according to claim 1, wherein the connecting element of the first closure element is engaged with the connecting element of the second closure element, and wherein the locking element of the first closure element and the locking element of the second closure element engage in the intumescent strip.

16. A closure element for a fire-protection sleeve, comprising:
    a body;
    a connecting element, wherein the body and the connecting element are formed in one piece;
    a locking element, wherein the locking element is disposed on the body;
    wherein the body has a spring element and wherein the locking element is disposed on the spring element; and
    a blocking element wherein, in a locking position, the blocking element acts on the spring element in a locking direction and prevents recoil of the spring element;
    wherein the body has guide rails on a side facing away from the locking element and wherein the blocking element is movable in the guide rails.

* * * * *